US008209199B1

(12) United States Patent
Abbs et al.

(10) Patent No.: US 8,209,199 B1
(45) Date of Patent: Jun. 26, 2012

(54) ANNUITY HAVING INTEREST RATE COUPLED TO A REFERENCED INTEREST RATE

(75) Inventors: Donald Paul Abbs, LaGrange, IL (US); Graham Donald Ireland, Glencoe, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 13/234,887

(22) Filed: Sep. 16, 2011

Related U.S. Application Data

(63) Continuation of application No. 12/689,872, filed on Jan. 19, 2010, now Pat. No. 8,036,968, which is a continuation of application No. 11/945,005, filed on Nov. 26, 2007, now Pat. No. 7,676,414, which is a continuation of application No. 11/847,077, filed on Aug. 29, 2007, now Pat. No. 7,613,644, which is a continuation of application No. 11/420,892, filed on May 30, 2006, now abandoned, which is a continuation of application No. 10/108,262, filed on Mar. 28, 2002, now Pat. No. 7,080,032.

(51) Int. Cl.
 G06Q 40/00 (2006.01)
(52) U.S. Cl. .............................. 705/4; 705/35
(58) Field of Classification Search .................. 705/4, 35
 See application file for complete search history.

(56) References Cited

U.S. PATENT DOCUMENTS

| 4,742,457 | A | 5/1988 | Leon |
| 5,689,649 | A | 11/1997 | Altman |
| 5,742,775 | A | 4/1998 | King |
| 5,832,461 | A | 11/1998 | Leon |
| 6,064,969 | A | 5/2000 | Haskins |
| 6,275,807 | B1 | 8/2001 | Schirripa |
| 6,611,815 | B1 | 8/2003 | Lewis |
| 6,636,834 | B1 | 10/2003 | Schirripa |
| 2003/0120566 | A1 | 6/2003 | Lipschutz |

FOREIGN PATENT DOCUMENTS

EP 1049037 2/2000

OTHER PUBLICATIONS

Allstate Life Insurance Company, Flexible Premium Deferred Annuity Contract, Oct. 2001, pp. 1-12 and two Annuity Data Pages, Northbrook, Illinois.
American Equity Investment Life Insurance Company, The Performance Equity-Indexed Annuity, A Gold Medal Performance!, Dec. 1999, pp. 1-4, Des Moines, Iowa.
Rankin, Jennifer C., Annuities: New Designs for a New Century, Resource, Jun. 2001, pp. 6-8 and 10-12.

Primary Examiner — Jagdish Patel
(74) Attorney, Agent, or Firm — Banner & Witcoff, Ltd.

(57) ABSTRACT

The methods described herein provide a guaranteed rate of return for a guarantee period of a financial account while at the same time providing upward adjustments to the interest rate if there is a corresponding increase in a specified referenced rate. The guaranteed base interest rate is set at the beginning of the guarantee period, the base interest rate to be credited to an account for an initial pre-defined period. Periodically, the then-current referenced rate is compared to a base referenced rate defined at the establishment of the guarantee period. If the referenced rate has increased, the interest rate that will be credited to the account value will increase by an amount that is based on the amount of increase in the referenced rate. If the referenced rate has not changed or has decreased, the interest rate that will be credited to the account value will be the guaranteed base interest rate.

20 Claims, 2 Drawing Sheets

| TIME | 5 YEAR TREASURY RATE AT BEGINNING OF YEAR | TREASURY UPSIDE | BASIC CREDITED RATE | TOTAL CREDITED RATE |
|---|---|---|---|---|
| YEAR 1 | 5% | 0% | 4.75% | 4.75% |
| YEAR 2 | 6% | 1% | 4.75% | 5.75% |
| YEAR 3 | 7% | 2% | 4.75% | 6.75% |
| YEAR 4 | 4% | 0% | 4.75% | 4.75% |
| YEAR 5 | 6% | 1% | 4.75% | 5.75% |

FIG. 2

ANNUITY HAVING INTEREST RATE COUPLED TO A REFERENCED INTEREST RATE

CROSS-REFERENCE TO RELATED APPLICATIONS

This application is a continuation of U.S. application Ser. No. 12/689,872, filed Jan. 19, 2010, which is a continuation of U.S. application Ser. No. 11/945,005, filed Nov. 26, 2007, now U.S. Pat. No. 7,676,414, issued Mar. 9, 2010, which is a continuation of U.S. application Ser. No. 11/847,077, filed Aug. 29, 2007, now U.S. Pat. No. 7,613,644, issued Nov. 3, 2009 which is a continuation of U.S. application Ser. No. 11/420,892, filed May 30, 2006, abandoned, which is a continuation of U.S. application Ser. No. 10/108,262, filed Mar. 28, 2002, now U.S. Pat. No. 7,080,032, issued Jul. 18, 2006, the disclosures and contents of which are hereby incorporated by reference in their entirety.

FIELD OF THE INVENTION

The present invention relates to an annuity and a method for managing an annuity that provides a guaranteed interest rate. More specifically, the invention relates to a method in which the guaranteed rate of interest paid on the principal of an annuity may increase in conjunction with increases in a referenced interest rate.

BACKGROUND

An annuity is a well-known financial vehicle used to pay a person a certain sum of money in a series of distributions made at regular intervals, such as monthly or annually, based on a given amount of principal consisting of an initial contribution of assets and any subsequent contributions and the appreciation (or depreciation) of the contributions. Annuities are characterized by an accumulation phase and a payout phase. During the accumulation phase, the annuity owner makes one or more purchase payments toward the value of the annuity account, and the annuity account value fluctuates, hopefully upwardly, based on the performance of one or more investment alternatives to which the account value is allocated. During the payout phase, the account value is applied to an income plan of the annuity owner's choosing under which the owner, or the owner's designee, will receive a specified number of income payments or income payments for a specified period.

Income plans are available in many forms. For example, the distributions may be made for a predetermined definite period, as in an annuity certain, or for as long as the person lives, as in a life annuity. Payments under a life annuity may terminate on the policy holder's death, as in a straight life annuity, or may continue to a beneficiary for a specified period after the policy holder's death, as in a life annuity with period certain. Alternatively, a life annuity may be based on two lives jointly, as in a joint and last-survivor annuity in which payments continue to be made to the survivor for the remainder of his or her life, or may provide a beneficiary a lump sum payment upon the death of the policy holder. The payments under an annuity may be set to begin on the purchase date of the annuity, as in an immediate annuity, or after a specified amount of time, as in a deferred annuity.

During the accumulation phase, the account value may be allocated to a fixed account or a variable account, or different portions of the account value can be allocated to fixed and variable accounts. In a variable account, the allocated proceeds are invested in non-guaranteed investment instruments, such as equities (stocks), bonds, money market funds, or mutual funds that invest in one or more of these instruments. In a fixed account, a fixed, guaranteed interest rate is credited to the allocated proceeds, and the rate is usually guaranteed for a finite duration known as the guarantee period.

Because the interest rate of a fixed annuity is locked in for the guarantee period, contract holders feel disadvantaged if prevailing interest rates available in other investment products increase during the guarantee period while the fixed annuity is locked in at a lower rate. For this reason, fixed annuities are not a desirable investment option for many consumers of investment products; the consumers fear being locked into an interest rate that may, during the guarantee period, be lower than prevailing interest rates available in other investment products.

Variable annuities obviate this problem because the variable annuity is not locked into a guaranteed interest rate. Through a variable annuity, the contract holder can participate in bond, equity, and money markets and thereby reap the benefits of upturns in those markets. On the other hand, such investments involve more risk and volatility than guaranteed fixed annuities, and, in addition to reaping the benefits of upturns, the contract holder must suffer through downturns in the markets underlying the variable account as well. Accordingly, variable annuities may not be desirable for some investors, especially investors operating under relatively short investment time horizons.

Therefore, a need exists for an annuity that provides guaranteed returns, as in a fixed annuity, while offering the possibility of higher returns without risk to principal.

SUMMARY OF THE INVENTION

The present invention provides a method of managing an annuity whereby the contract holder is provided a guaranteed rate of return, while at the same time allowing the rate of return to increase if there are corresponding increases in a referenced interest rate to which the annuity account is linked. The referenced rate is a known rate which provides a benchmark that is readily accessible to both the contract holder and a potential annuity consumer. Referenced rates may include, for example, United States Treasury rates or interest rates used to settle contracts traded on financial futures exchanges. There are no mysterious formulae tied to indices or benchmarks that are obscure to the typical annuity consumer for calculating the interest rate to be applied to the account. The annuity account managed in accordance with the present invention is fixed in the sense that the contract holder will receive a guaranteed interest rate below which the applied interest rate will not fall during the guarantee period, but is flexible in the sense that the contract holder will enjoy the benefit of upturns in the referenced rate to which the account is linked.

More specifically, according to one aspect of the invention, a method of administering an annuity account comprises defining a base interest rate, the base interest rate being applied to the value of the account for an initial predefined period, defining a base referenced rate, which may be a specified United States Treasury rate as of a specified date, and for each subsequent predefined period following the initial period: (1) determining the current referenced rate, which is the specified United States Treasury rate on the date that the current referenced rate is determined; and (2) defining a total interest rate that will be applied to the value of the account during that subsequent predefined period, wherein: (a) if the current referenced rate is less than or equal to the base referenced rate, the total interest rate will be equal to the base interest rate; and (b) if the current referenced rate is greater than the base referenced rate, the total interest rate will be the sum of the base referenced rate and an interest rate enhancement that is determined based on the difference between the current referenced rate and the base referenced rate.

According to another aspect of the invention, an annuity comprises a base interest rate, a guarantee period, and an interest enhancement linked to a referenced rate, such as a specified United States Treasury rate. During the guarantee period the interest credited to the value of an account of the annuity will not be less than the base interest rate. The interest enhancement is calculated periodically throughout the guarantee period and is based on changes in the referenced rate from a base value of the referenced rate defined when the account is established. If the referenced rate on the date the interest enhancement is calculated is not greater than the base value of the referenced rate, the interest enhancement is zero. If the referenced rate on the date the interest enhancement is calculated is greater than the base value of the referenced rate, the interest enhancement is calculated by taking the difference between: (1) the referenced rate on the date the interest enhancement is calculated and (2) the base value of the referenced rate, and multiplying the difference by an upside participation factor. An interest rate that is credited to the account of the annuity after the interest enhancement is calculated is the sum of the base interest rate and the interest enhancement.

As an alternative to a specified Treasury rate, the referenced rate may be an interest rate used to settle a contract that is traded on a financial futures exchange.

Accordingly, during the guarantee period, which, in a preferred embodiment, is five years, the interest rate will never fall below the base interest rate set at the beginning of the guarantee period, and periodically, preferably annually, the interest rate is adjusted upwardly if there is a corresponding increase in the referenced rate.

With these and other objects, advantages and features of the invention that may become hereinafter apparent, the nature of the invention may be more clearly understood by reference to the following detailed description of the invention, the appended claims and to the several drawings attached herein.

BRIEF DESCRIPTION OF THE DRAWINGS

The invention will be described in detail with reference to the following drawings, in which:

FIG. 2 is an exemplary table illustrating the management of the annuity contract of the present invention.

DETAILED DESCRIPTION OF THE PREFERRED EMBODIMENTS

Figure 1:
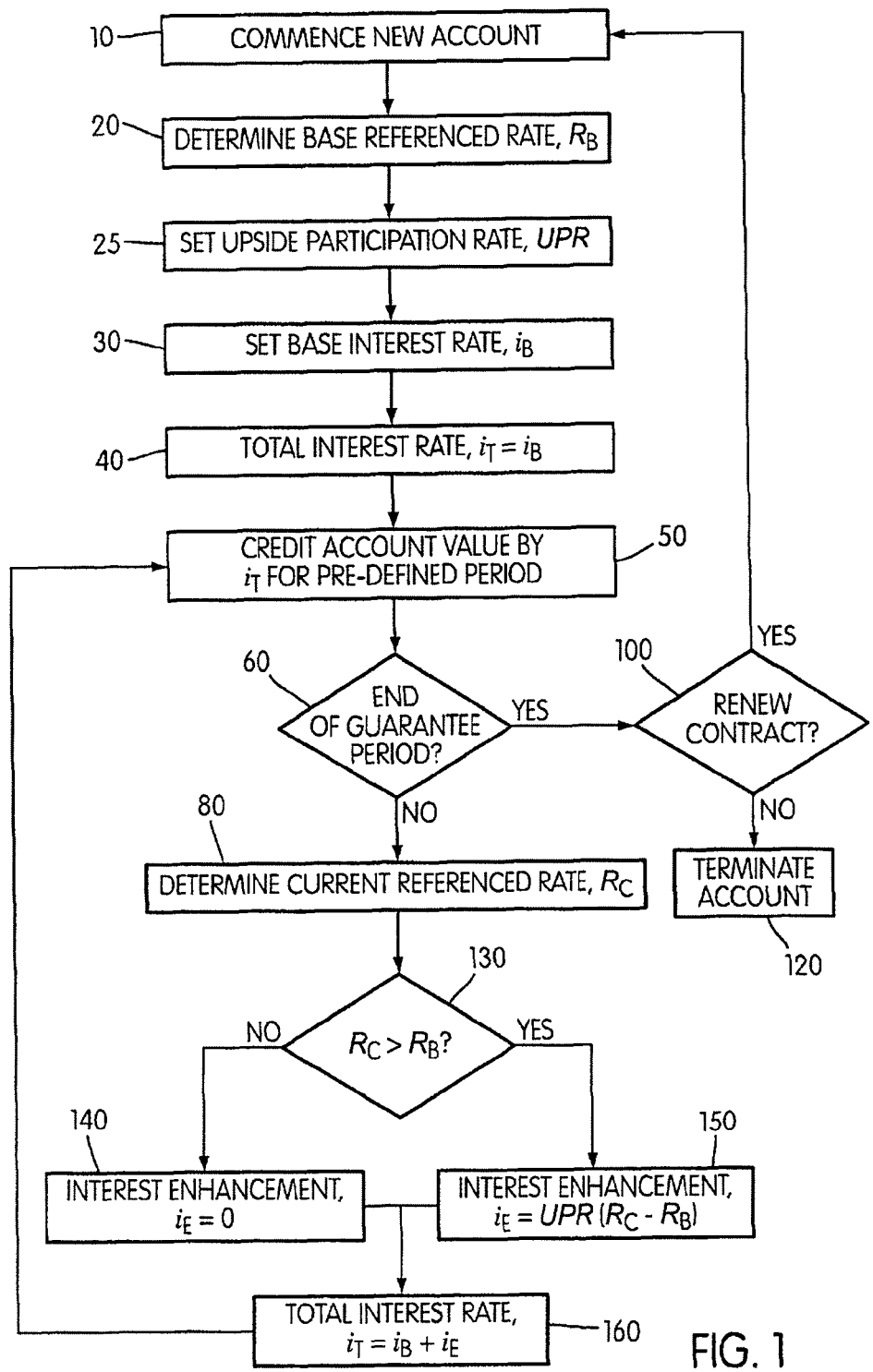
FIG. 1 is a flow chart schematically illustrating the steps taken in managing the annuity contract of the present invention.

Management of the annuity contract of the present invention is schematically illustrated in FIG. 1. The annuity contract may be purchased from an authorized agent for an initial contribution (known as a purchase payment). The contract preferably has a specified time duration (known as the guarantee period) which most preferably is five years from the date of initial purchase.

The contract preferably guarantees a competitive fixed interest rate plus participation in upward movements in a specified referenced interest rate, such as a specified Treasury rate, after issue. The customer value in this is that they don't lock into a fixed rate investment that pays a relatively low rate of return for many years.

The crediting formula for growth of the annuity account is preferably defined as a rolling base interest rate ($i_B$) guaranteed for a specified duration, preferably five years, although other specified durations could be defined. As indicated, the base interest rate is guaranteed for the specified duration (i.e., the guarantee period); that is, the interest rate paid on the account value will not fall below the base rate during the specified duration. The guaranteed base rate is preferably a rolling rate for the specified duration, meaning that subsequent contributions made to the annuity account are treated as independent sub-accounts and each will be credited with a new, and possibly different, base rate determined when the contribution is made and that base rate will be guaranteed for the specified duration (e.g., five years) from the date of the subsequent contribution.

There are less preferred alternatives to employing a rolling interest rate and creating a new sub-account for each purchase payment made after the contact is established. For example, subsequent purchase payments may be prohibited in an established contract. Thus, each purchase payment constitutes an initial purchase payment establishing a new annuity contract. Alternatively, subsequent purchase payments into the account may be subject to the base interest rate defined when the contract is first established and may not change the termination date of the guarantee period. Thus, all purchase payments under the contract would contribute to the value of the same "account."

In the context of the remaining description, unless otherwise stated, the term "account" will apply to any of the alternatives described above and obvious variations thereof. Thus, "account" may mean an account into which no subsequent purchase payments may be made, an account in which subsequent purchase payments are subject to the same base interest rate and do not affect the termination date of the guarantee period, or a sub-account with an associated base interest rate and guarantee period established by each purchase payment.

A new account commences (step 10 in FIG. 1) with a purchase payment, and each account has its own guaranteed base interest rate ($i_B$) and guarantee period commencing on the date of the purchase payment. The base interest rate is set in accordance with known methods and analyses based on prevailing market conditions.

Each account is credited with the corresponding base interest rate for an initial pre-defined period, which is some portion of the guarantee period. For example, where the guarantee period is five years, the duration may be divided into five pre-defined periods of one year each. Other pre-defined periods may be employed, for example semi-annual, monthly, bi-monthly, bi-annual, etc.

At the time a base interest rate is defined, a base value of a referenced interest rate is defined. This base value of the referenced interest rate will be referred to as the "base referenced rate" ($R_B$) (step 20 in FIG. 1). In the preferred embodiment, the referenced rate is a specified United States Treasury yield rate, and most preferably is the five-year Constant Maturity United States Treasury yield (hereafter, the five-year U.S. Treasury rate). Other Treasury rates which could be employed in the present invention include the five-year "on-the-run" Treasury rate, the 10-year Treasury rate, and rates on other Treasury notes or bonds which bear a stated interest rate.

Alternatively, the referenced rate may be the interest rate used to settle any contract that is traded on a financial futures exchange as of a specified date. Examples of such rates include swap rates, Eurodollar rates, and the London Interbank Offer Rate ("LIBOR"). Examples of financial futures exchanges include the Chicago Mercantile Exchange ("CME"), the Chicago Board of Trade ("CBOT"), the London International Financial Futures Exchange ("LIFFE"), and the Singapore Exchange Limited.

The base referenced rate may be the referenced interest rate on any date that may be specified in accordance with the annuity contract. For example, the base referenced rate may be the closing rate on the date the contract is established or the closing rate on the trading day immediately preceding the date the contract is established. It may be the closing rate on the first trading day of the month or year in which the contract is established. The referenced rate may be a snap-shot value, or it may be a rate averaged over a predefined period (e.g., day, week, month, year) preceding or encompassing the date on which the contract is established.

An upside participation rate ("UPR") is also defined (step 25 in FIG. 1) at the time the base interest rate is defined. The function of the UPR will be described below.

The base interest rate ($i_B$) is set (step 30 in FIG. 1) in accordance with factors such as prevailing market conditions in effect at the time the base interest rate is set, anticipated hedge positions for the annuity underwriter, etc. The considerations, analyses, and methodology for setting the base interest rate for the current invention are preferably the same considerations, analyses, and methodology that would be used in setting the interest rate for a conventional fixed account annuity and will not be explained in detail herein as they would be readily appreciated by those of ordinary skill in the art. It is preferred, however, that the base interest rate be set at a level below the guaranteed interest rate that would be set for a comparable conventional fixed annuity with a comparable guarantee period. As will be explained in more detail below, the annuity owner will enjoy the benefits of periodic upturns in the referenced rate, but will not suffer in the event of downturns in the referenced rate because the base interest rate ($i_B$) is guaranteed for the guarantee period. Accordingly, it is preferable to set the base interest rate somewhat lower than the base interest rate for a comparable conventional fixed annuity to recover the costs of providing interest enhancements corresponding to upturns in the referenced rate.

The actual base interest rate may be set based on the size of the account, with large accounts exceeding a pre-defined threshold being credited with a higher base interest rate (e.g., 0-25 basis points below a comparable conventional fixed account interest rate) as compared to the base interest rate credited to accounts that do not exceed the pre-defined threshold (e.g., 50-60 basis points below a comparable conventional fixed account interest rate). Two or more account threshold tiers may be defined for a corresponding base interest rate tier.

Alternatively, the base interest rate for all accounts may be identical, with certain upward interest rate adjustments made for account values exceeding predefined thresholds as of the date the guarantee period for that account was established. So long as the account value exceeds the pre-defined threshold, the total guaranteed interest rate will be the base interest rate plus the upward adjustment, and the guaranteed interest rate may exceed the base referenced rate. If the value of the account falls below the predefined threshold, for example because of withdrawals by the contract holder, the total guaranteed interest rate will be the base interest rate, and the policy holder will still be able to participate in upward changes in the referenced interest rate.

A total interest rate ($i_T$), which for the first predefined period (e.g., the first year) is the base interest rate ($i_B$) (step 40 of FIG. 1), is credited to the account for the pre-defined period (step 50 of FIG. 1).

At the end of the pre-defined period, (e.g., at the anniversary of the purchase payment), provided the guarantee period has not come to an end (step 60 of FIG. 1), the referenced interest rate (e.g., the specified U.S. Treasury rate), referred to as the current referenced rate ($R_C$), is determined (step 80 of FIG. 1), and the current referenced rate is compared to the base referenced rate (step 130 of FIG. 1) to determine an interest enhancement $i_E$.

The current referenced rate may be the referenced interest rate on any date that may be specified in accordance with the annuity contract. For example, the current referenced rate may be the closing rate on the date the current referenced rate is determined or the closing rate on the trading day immediately preceding the date the current referenced rate is determined. It may be the closing rate on the first trading day of the month or year in which the current referenced rate is determined. The referenced rate may be a snap-shot value or a rate averaged over a predefined period (e.g., day, week, month, year) preceding or encompassing the date on which the current referenced rate is determined. In the preferred embodiment, the date on which the current referenced rate is determined is each anniversary of the initial purchase payment.

Alternatively, the date on which the current referenced rate is determined may be a preceding date on which the referenced rate was highest. For example, if on the first anniversary of the initial purchase payment the referenced rate is 7% and on the second anniversary the referenced rate is 6%, the date on which the current referenced rate is determined on the second anniversary will be the first anniversary, and the current referenced rate will be 7%. If on the third anniversary the referenced rate is 7.5%, the date on which the current referenced rate is determined on the third anniversary will be the third anniversary, and the current referenced rate will be 7.5%. Thus, under this alternative, the current referenced rate can never fall; it can only increase or stay the same.

If the current referenced rate exceeds the base referenced rate, the interest enhancement will be the difference between the current and base referenced rates multiplied by the upside participation rate (UPR) (step 150 of FIG. 1):

$$i_E = \text{UPR}(R_C - R_B).$$

In a preferred embodiment, the upside participation rate UPR, which may be 1 (i.e., 100%), is set when the contract is established (step 125 in FIG. 1) and does not change during the guarantee period.

On the other hand, if the current referenced rate does not exceed (i.e., is less than or equal to) the base referenced rate, the interest enhancement is zero ("0") (step 140 in FIG. 1).

The total interest rate ($i_T$) is the sum of the base interest rate and interest enhancement (step 160 of FIG. 1):

$$i_T = i_B + i_E.$$

For each subsequent pre-defined period for the remainder of the guarantee period of the annuity contract, the total interest rate to be credited to the account value for that period is determined by comparing the current referenced rate to the base referenced rate and adding some portion of any increase over the base referenced rate to the base interest rate. (i.e., return to step 50 of FIG. 1). If there should be a decrease from the base referenced rate, the total interest rate for that period will be the guaranteed base interest rate.

As would be readily apparent to persons having ordinary skill in art, the methodology described herein can be implemented using electronic storage and computing means, whereby the present value of the account, the total interest rate, and the components employed to determine the total interest rate are electronically stored, and the interest rate is computed and applied to the account value by appropriately programmed computer algorithms. The programming of such algorithms to perform the methodology described herein is well within the skill of persons of ordinary skill in the art, and thus a detailed explanation of the programming of such algorithms—beyond the detailed explanation of the methodology provided herein—is not necessary.

In a preferred manner of managing the above-described annuity account, certain restrictions are implemented. For example, contract provisions may require a $5000 initial purchase payment for qualified contracts (e.g., contracts that are part of an IRA or 401(k) account) and $3000 initial purchase payment for non-qualified contracts. Subsequent purchase payments must be $100 or more. In addition, while the contract holder is allowed to withdraw up to 10% of the account value each year penalty free, diminishing surrender charges are assessed for withdrawals beyond 10% of the account value according to the following surrender charge schedule:

| Year | Surrender Charge (% of Withdrawn amount beyond 10% of Account Value) |
|---|---|
| 1 | 9% |
| 2 | 8% |
| 3 | 8% |
| 4 | 7% |
| 5 | 6% |
| 6 | 5% |
| 7 | 4% |
| 8 | 3% |
| 9 | 2% |
| 10 | 1% |

Just as each contribution beyond the initial purchase payment, in the preferred embodiment, commences a new sub-account with its own base interest rate, guarantee period, and total credited interest rate schedule, so too is each contribution subject to a ten-year surrender charge schedule. Surrender changes may be waived in the event of terminal illness, unemployment, death of the spouse-account owner, confinement to nursing home, or required minimum distributions for individual retirement accounts.

At the end of five years, the owner is given a 45-day window to withdraw some or all of the value of the account penalty-free and may renew the annuity contract for any remaining account value (step 100 of FIG. 1). A new base interest rate will be set, a new guarantee period will begin, a new referenced rate is determined, and a new upside participation rate is set. If the contract holder elects to withdraw all of the value of the account, the account is terminated (step 120 of FIG. 1).

The following example, with reference to the table at FIG. 2, illustrates the management of the annuity of the present invention.

John and Mary Smith purchased an annuity on Dec. 9, 2001 with an initial purchase payment of $15,000. In the example, the referenced interest rate is a specified U.S. Treasury rate, and the base Treasury rate determined on the date of purchase is 5% and the guaranteed base interest rate (referred to in FIG. 2 as the basic credited rate) set for the Smiths is 4.75%. For that first year, i.e., until Dec. 8, 2002, the Smiths will receive a total interest rate (i.e., total credited rate in FIG. 2) of 4.75%.

On Dec. 9, 2002, the first anniversary of the Smith's purchase payment, the current Treasury rate is 6%, a 1% increase (i.e., Treasury upside in FIG. 2) over the base Treasury rate of 5%. In the illustrated example, the upside participation rate, UPR, is 1 (i.e., 100%), so the total credited rate the Smiths will enjoy from Dec. 9, 2002-Dec. 8, 2003, will be 5.75%. On Dec. 9, 2003, the current Treasury rate is 7%, and the 2% Treasury upside is added to the basic credited rate. Thus, for the year Dec. 9, 2003-Dec. 8, 2004, the Smiths will enjoy a total credited rate of 6.75%. On Dec. 9, 2004, the current Treasury rate has fallen to 4%, 1% below the base Treasury rate of 5%, for a Treasury upside of 0%. For the year Dec. 9, 2004 to Dec. 8, 2005, the Smiths will still enjoy the guaranteed basic credited rate of 4.75%. That is, the Smiths do not see a drop in their basic credited rate despite the fact that the Treasury rate has fallen below the base Treasury rate. On Dec. 9, 2005, the current Treasury rate is back up to 6%, and the 1% Treasury upside is added to the basic credited rate. Thus, for the fifth year from Dec. 9, 2005-Dec. 8, 2006, the Smiths will enjoy a total credited rate of 5.75%.

At the end of the fifth year, the Smiths can withdraw the entire value of the sub-account, or they can renew the sub-account contract for a new (and possibly different) base interest rate for the new 5-year guarantee period.

Although a preferred embodiment is specifically illustrated and described herein, it will be appreciated that modifications and variations of the present invention are covered by the above teachings and within the purview of the appended claims without departing from the spirit and intended scope of this invention.

We claim:

1. A method comprising:
   receiving a first purchase payment to be credited to a financial account;
   setting, at a processor, a first initial benchmark interest rate to be applied to the first purchase payment as of a first initial date;
   based on the first initial benchmark interest rate, setting, at the processor, a first base interest rate to be applied to the first purchase payment in the financial account for a first initial period;
   setting, at the processor, a first subsequent benchmark interest rate to be applied to the first purchase payment as of a first subsequent date;
   determining, at the processor, a first subsequent total interest rate to be applied to the first purchase payment in the financial account for a first subsequent period by comparing the first initial benchmark interest rate to the first subsequent benchmark interest rate wherein:
   (A) when the first subsequent benchmark interest rate is less than or equal to the first initial benchmark interest rate, setting the first subsequent total interest rate to the first base interest rate;
   (B) when the first subsequent benchmark interest rate is greater than the first initial benchmark interest rate, computing the first subsequent total interest rate to be the sum of the first base interest rate and a first factor that is associated in a first preset manner to the increase in the first initial benchmark interest rate; and
   (C) when a first value of the financial account exceeds a first predefined threshold, adding a first upward interest rate adjustment to the first subsequent total interest rate determined in (A) or (B).

2. The method of claim 1, further comprising: receiving a second purchase payment to be credited to the financial account.

3. The method of claim 2, further comprising: setting, at the processor, a second initial benchmark interest rate to be applied to the second purchase payment as of a second initial date.

4. The method of claim 3, further comprising:
    based on the second initial benchmark interest rate, setting, at the processor, a second base interest rate to be applied to the second purchase payment in the financial account for a second initial period;
    setting, at the processor, a second subsequent benchmark interest rate to be applied to the second purchase payment as of a second subsequent date;
    determining, at the processor, a second subsequent total interest rate to be applied to the second purchase payment in the financial account for a second subsequent period by comparing the second initial benchmark interest rate to the second subsequent benchmark interest rate and:
        (A) when the second subsequent benchmark interest rate is less than or equal to the second initial benchmark interest rate, setting the second subsequent total interest rate to the second base interest rate;
        (B) when the second subsequent benchmark interest rate is greater than the second initial benchmark interest rate, computing the second subsequent total interest rate to be the sum of the second base interest rate and a second factor that is associated in a second preset manner to the increase in the second initial benchmark interest rate; and
        (C) when a second value of the financial account exceeds a second predefined threshold, adding a second upward interest rate adjustment to the second subsequent total interest rate determined in (A) or (B).

5. The method of claim 1, wherein the first initial benchmark interest rate and the first subsequent benchmark interest rate are both associated with a five-year Constant Maturity United States Treasury yield.

6. The method of claim 1, wherein the first initial benchmark interest rate and the first subsequent benchmark interest rate are both associated with a five year on-the-run Treasury rate.

7. The method of claim 1, wherein the first initial benchmark interest rate and the first subsequent benchmark interest rate are both associated with a ten year Treasury rate.

8. The method of claim 1, wherein the first initial benchmark interest rate and the first subsequent benchmark interest rate are associated with other interest rates used to settle contracts traded on a financial futures exchange.

9. The method of claim 8, wherein the other interest rates used to settle contracts traded on the financial futures exchange include swap rates, Eurodollar rates, and the London Interbank Offer Rate (LIBOR).

10. The method of claim 1, wherein the first initial benchmark interest rate is chosen as a closing rate on a day that the financial account is established.

11. The method of claim 1, wherein the first initial benchmark interest rate is chosen as a closing rate on a second day immediately preceding a first day that the financial account is established.

12. The method of claim 1, wherein the first initial benchmark interest rate is chosen as a closing rate on a first trading day of a month in which the first initial benchmark interest rate is determined.

13. The method of claim 1, wherein the first initial benchmark interest rate is an averaged rate averaged over a predefined period.

14. The method of claim 1, wherein the first base interest rate is set at a level below a conventional interest rate for a comparable conventional fixed annuity with a comparable guarantee period.

15. The method of claim 1, wherein the first base interest rate is set based on a size of the financial account.

16. An apparatus comprising:
    a processor; and
    a memory storing computer-readable instructions that, when executed by the processor, cause the apparatus at least to perform:
    receiving a first purchase payment to be credited to a financial account;
    setting a first initial benchmark interest rate to be applied to the first purchase payment as of a first initial date;
    based on the first initial benchmark interest rate, setting a first base interest rate to be applied to the first purchase payment in the financial account for a first initial period;
    setting a first subsequent benchmark interest rate to be applied to the first purchase payment as of a first subsequent date;
    determining a first subsequent total interest rate to be applied to the first purchase payment in the financial account for a first subsequent period by comparing the first initial benchmark interest rate to the first subsequent benchmark interest rate wherein:
        (A) when the first subsequent benchmark interest rate is less than or equal to the first initial benchmark interest rate, setting the first subsequent total interest rate to the first base interest rate;
        (B) when the first subsequent benchmark interest rate is greater than the first initial benchmark interest rate, computing the first subsequent total interest rate to be the sum of the first base interest rate and a first factor that is associated in a first preset manner to the increase in the first initial benchmark interest rate; and
        (C) when a first value of the financial account exceeds a first predefined threshold, adding a first upward interest rate adjustment to the first subsequent total interest rate determined in (A) or (B).

17. The apparatus of claim 16, wherein the first initial benchmark interest rate is chosen to be a highest rate on any day prior to and including a day when the first initial benchmark interest rate is determined.

18. The apparatus of claim 16, wherein the first factor is multiplied by a difference between the first initial benchmark interest rate and the first subsequent benchmark interest rate.

19. A non-transitory computer-readable storage medium having computer-executable program instructions stored thereon that when executed by a processor, cause the processor to perform steps comprising:
    receiving a first purchase payment to be credited to a financial account;
    setting a first initial benchmark interest rate to be applied to the first purchase payment as of a first initial date;
    based on the first initial benchmark interest rate, setting a first base interest rate to be applied to the first purchase payment in the financial account for a first initial period;
    setting a first subsequent benchmark interest rate to be applied to the first purchase payment as of a first subsequent date;
    determining a first subsequent total interest rate to be applied to the first purchase payment in the financial account for a first subsequent period by comparing the first initial benchmark interest rate to the first subsequent benchmark interest rate wherein:

(A) when the first subsequent benchmark interest rate is less than or equal to the first initial benchmark interest rate, setting the first subsequent total interest rate to the first base interest rate;
(B) when the first subsequent benchmark interest rate is greater than the first initial benchmark interest rate, computing the first subsequent total interest rate to be the sum of the first base interest rate and a first factor that is associated in a first preset manner to the increase in the first initial benchmark interest rate; and
(C) when a first value of the financial account exceeds a first predefined threshold, adding a first upward interest rate adjustment to the first subsequent total interest rate determined in (A) or (B).

20. The non-transitory computer-readable storage medium of claim 19, wherein the first purchase payment is $5000 or more.

* * * * *